United States Patent
Makino

(10) Patent No.: US 12,024,121 B2
(45) Date of Patent: Jul. 2, 2024

(54) IN-VEHICLE APPARATUS THAT COMMUNICATES WITH A MOBILE DEVICE

(71) Applicant: SUBARU CORPORATION, Tokyo (JP)

(72) Inventor: Kazuki Makino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 858 days.

(21) Appl. No.: 17/060,366

(22) Filed: Oct. 1, 2020

(65) Prior Publication Data

US 2021/0146882 A1 May 20, 2021

(30) Foreign Application Priority Data

Nov. 20, 2019 (JP) .................................. 2019-209487

(51) Int. Cl.
*G06Q 10/02* (2012.01)
*B60R 25/04* (2013.01)
(Continued)

(52) U.S. Cl.
CPC .............. *B60R 25/24* (2013.01); *B60R 25/04* (2013.01); *B60R 25/10* (2013.01); *B60R 25/09* (2013.01);
(Continued)

(58) Field of Classification Search
CPC ........ G06Q 10/02; G06Q 20/42; B60R 25/24; B60R 25/04; B60R 2025/1013;
(Continued)

(56) References Cited

U.S. PATENT DOCUMENTS 11,456,874 B2 * 9/2022 Mullett ................ H04L 9/3239
2003/0209893 A1 * 11/2003 Breed ............... B60R 21/01536
701/45
(Continued)

FOREIGN PATENT DOCUMENTS

JP 2000-067392 A 3/2000
JP 2015-057686 A 3/2015
(Continued)

OTHER PUBLICATIONS

JP 2019071560 A (Car Sharing System—an English translation) (Published Year: 2019).*
(Continued)

*Primary Examiner* — Cuong H Nguyen
(74) *Attorney, Agent, or Firm* — Rimon PC

(57) ABSTRACT

A vehicle control system includes an in-vehicle apparatus. The in-vehicle apparatus includes a drive device, an authentication unit, a determining unit, and an operation detecting unit. The authentication unit is configured to perform authentication of a mobile device on the basis of a wireless communication. The determining unit is configured to determine whether a vehicle is in a predetermined driving state. The operation detecting unit is configured to detect presence of an operation of the mobile device by receiving a signal transmitted from the mobile device. The in-vehicle apparatus is configured to execute a predetermined safety control, on a condition that the drive device is unlocked as a result of success in the authentication performed by the authentication unit, the vehicle is determined by the determining unit as being in the predetermined driving state, and the operation of the mobile device is detected by the operation detecting unit.

19 Claims, 4 Drawing Sheets

(51) Int. Cl.
  *B60R 25/10* (2013.01)
  *B60R 25/24* (2013.01)
  *H04Q 9/00* (2006.01)
  *B60R 25/09* (2013.01)
  *B60R 25/20* (2013.01)
  *G06Q 30/0645* (2023.01)

(52) U.S. Cl.
  CPC ... *B60R 2025/1013* (2013.01); *B60R 25/2018* (2013.01); *B60R 25/241* (2013.01); *B60R 2325/10* (2013.01); *G06Q 30/0645* (2013.01)

(58) Field of Classification Search
  CPC ....... B60R 2325/10; B60R 25/10; H04L 9/32; H04L 9/3239; H04L 9/3236; H04L 9/38; H04L 9/3247
  See application file for complete search history.

(56) References Cited

U.S. PATENT DOCUMENTS

| | | | | |
|---|---|---|---|---|
| 2012/0109610 A1* | 5/2012 | Anderson | ......... | B60W 50/0098 703/7 |
| 2019/0106084 A1* | 4/2019 | Matsuyama | ............ | B60R 25/24 |
| 2019/0250622 A1* | 8/2019 | Nister | ............... | B60W 60/0027 |
| 2020/0209867 A1* | 7/2020 | Valois | ................. | G05D 1/0257 |
| 2022/0134999 A1* | 5/2022 | Nakashima | ......... | G07F 17/0057 701/2 |

FOREIGN PATENT DOCUMENTS

| | | | | |
|---|---|---|---|---|
| JP | 2017-115439 A | | 6/2017 | |
| JP | 2017-199205 A | | 11/2017 | |
| JP | 2018-002035 A | | 1/2018 | |
| JP | 2018-156539 A | | 10/2018 | |
| JP | 2019-26211 A | | 2/2019 | |
| JP | 2019071560 A | * | 5/2019 | ............. B60R 25/24 |

OTHER PUBLICATIONS

J. A. Afonso et al "IoT system for anytime/anywhere monitoring and control of vehicles' parameters," 2017 IEEE International Conference on Service Operations and Logistics, and Informatics (SOLI), Bari, Italy, 2017, pp. 193-198, doi: 10.1109/SOLI.20 (Year : 2017).*
Office Action issued in corresponding Japanese Patent Application No. 2019-209487, dated Jun. 13, 2023, with English translation.

* cited by examiner

IN-VEHICLE APPARATUS THAT COMMUNICATES WITH A MOBILE DEVICE

CROSS-REFERENCE TO RELATED APPLICATIONS

The present application claims priority from Japanese Patent Application No. 2019-209487 filed on Nov. 20, 2019, the entire contents of which are hereby incorporated by reference.

BACKGROUND

The technology relates to a vehicle control system. For example, the technology relates to a vehicle control system configured to detect an operation of a mobile device performed, during driving of a vehicle, by a driver who carries the mobile device and thereby control the vehicle.

A widespread use of a mobile device such as a smartphone or a tablet terminal has led to a development of a technique related to a telematics service in recent years. The telematics service is based on a communication function provided in an in-vehicle apparatus mounted on the vehicle and provides a service by causing the in-vehicle apparatus and the mobile device to cooperate with each other.

For example, Japanese Unexamined Patent Application Publication (JP-A) No. 2017-115439 discloses a technique that notifies a mobile device, belonging to a user, of an unauthorized authentication performed on an in-vehicle apparatus of a vehicle owned by the user, in a case where the authentication that utilizes a wireless communication is performed by a third person in an unauthorized fashion.

The development of the technique related to the telematics service between the vehicle and the mobile device thus makes it possible to improve convenience of the user. For example, it is possible to confirm a state of the vehicle by the mobile device at a location distant from the vehicle. The development of the telematics technique, on the other hand, has led to an increase in a rate of carrying the mobile device even during driving of the vehicle. This has raised a concern that the driver may possibly operate the mobile device despite during the driving, which can become a factor in occurrence of a traffic accident.

In some countries, operating the mobile device during the driving of the vehicle is prohibited or restricted by applicable laws or regulations. To ensure further safety, a system has been developed for a vehicle that restrains the driver from operating the mobile device during the driving.

For example, JP-A No. 2018-156539 discloses an in-vehicle warning device that warns a driver in a case where the driver has operated a mobile device during driving of a vehicle. The warning device includes a shift sensor, an infrared sensor, a camera, and a speaker. The shift sensor detects a shift position of a shift lever provided in the vehicle. The infrared sensor measures a heat distribution inside a vehicle compartment. The camera captures an image inside the vehicle compartment. The speaker performs warning on the driver.

The warning device detects presence of the operation of the mobile device performed by the driver on the basis of the heat distribution inside the vehicle compartment acquired by the infrared sensor and data on the image of the inside of the vehicle compartment acquired by the camera, in a case where the shift position of the shift lever is at a position other than the parking range and where the vehicle is traveling. The warning device generates a warning sound from the speaker to warn the driver in a case where the operation of the mobile device is detected.

SUMMARY

An aspect of the technology provides a vehicle control system that includes an in-vehicle apparatus. The in-vehicle apparatus is to be mounted on a vehicle and configured to perform a wireless communication with a mobile device. The in-vehicle apparatus includes a drive device, an authentication unit, a determining unit, and an operation detecting unit. The drive device is configured to generate drive force that causes the vehicle to travel. The authentication unit is configured to perform authentication of the mobile device on the basis of the wireless communication. The determining unit is configured to determine whether the vehicle is in a predetermined driving state. The operation detecting unit is configured to detect presence of an operation of the mobile device by receiving a signal transmitted from the mobile device. The in-vehicle apparatus is configured to execute a predetermined safety control that promotes safety of the vehicle, on a condition that the drive device is unlocked as a result of success in the authentication performed by the authentication unit, the vehicle is determined by the determining unit as being in the predetermined driving state, and the operation of the mobile device is detected by the operation detecting unit.

An aspect of the technology provides a vehicle control system that includes an in-vehicle apparatus. The in-vehicle apparatus is to be mounted on a vehicle and configured to perform a wireless communication with a mobile device. The in-vehicle apparatus includes a drive device and circuitry. The drive device is configured to generate drive force that causes the vehicle to travel. The circuitry is configured to perform authentication of the mobile device on the basis of the wireless communication, determine whether the vehicle is in a predetermined driving state, and detect presence of an operation of the mobile device by receiving a signal transmitted from the mobile device. The in-vehicle apparatus is configured to execute a predetermined safety control that promotes safety of the vehicle, on a condition that the drive device is unlocked as a result of success in the authentication performed by the circuitry, the vehicle is determined by the circuitry as being in the predetermined driving state, and the operation of the mobile device is detected by the circuitry.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
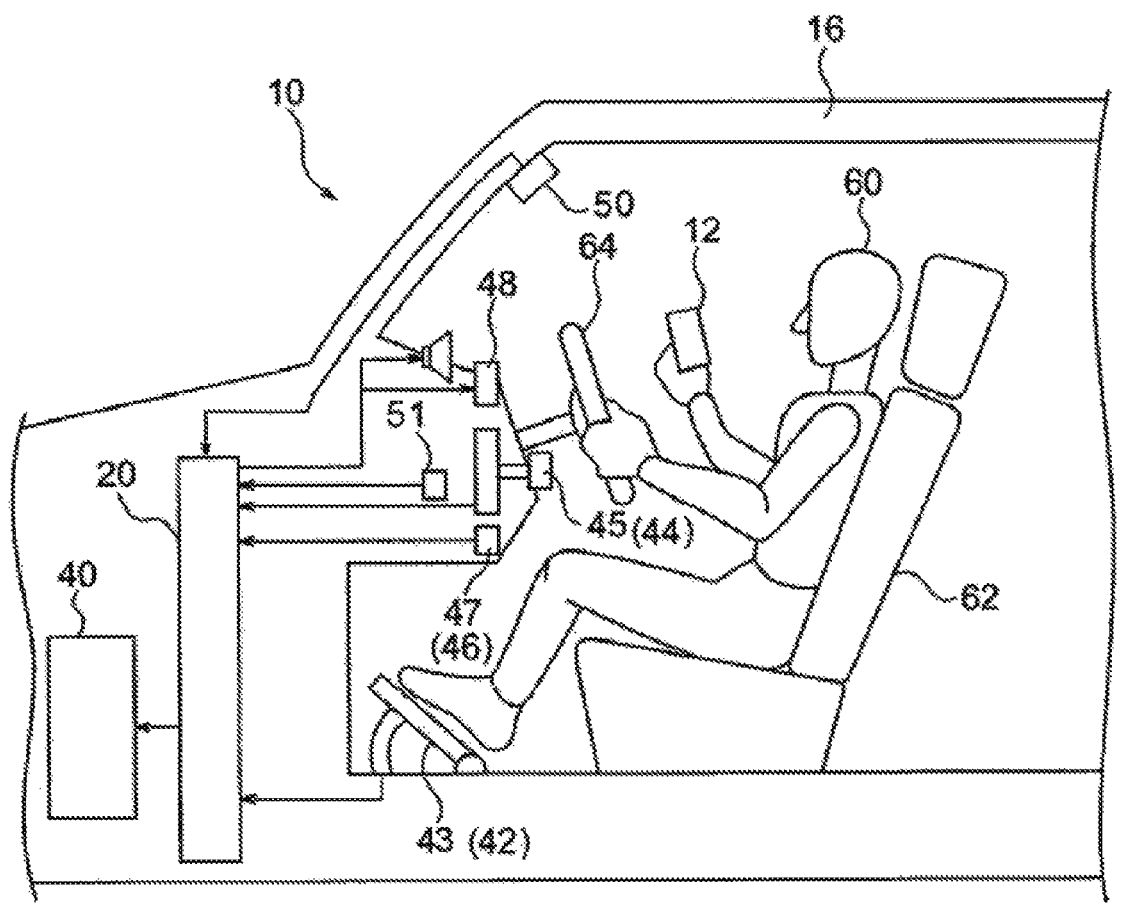
FIG. 1 is an explanatory diagram illustrating an outline of a vehicle control system according to one example embodiment of the technology.

A warning device disclosed in JP-A No. 2018-156539 indirectly detects an operation of a mobile device by means of an infrared sensor and a camera. Accordingly, the warning device can fail to detect the operation of the mobile device despite the presence of the operation of the mobile device actually performed by a driver. For example, it is likely that the warning device fails to detect the operation of the mobile device in a case where the mobile device is operated at a location in the vehicle compartment undetectable by the sensors.

It is desirable to provide a vehicle control system that is directed to a system that performs a communication between a vehicle and a mobile device and able to detect an operation of a mobile device during driving of a vehicle and to ensure safety of the vehicle in a case where the mobile device is operated.

In the following, some embodiments of the technology are described in detail with reference to the accompanying drawings. Note that sizes, materials, specific values, and any other factors illustrated in respective embodiments are illustrative for easier understanding of the technology, and are not intended to limit the scope of the technology unless otherwise specifically stated. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the technology are unillustrated in the drawings.

Figure 2:
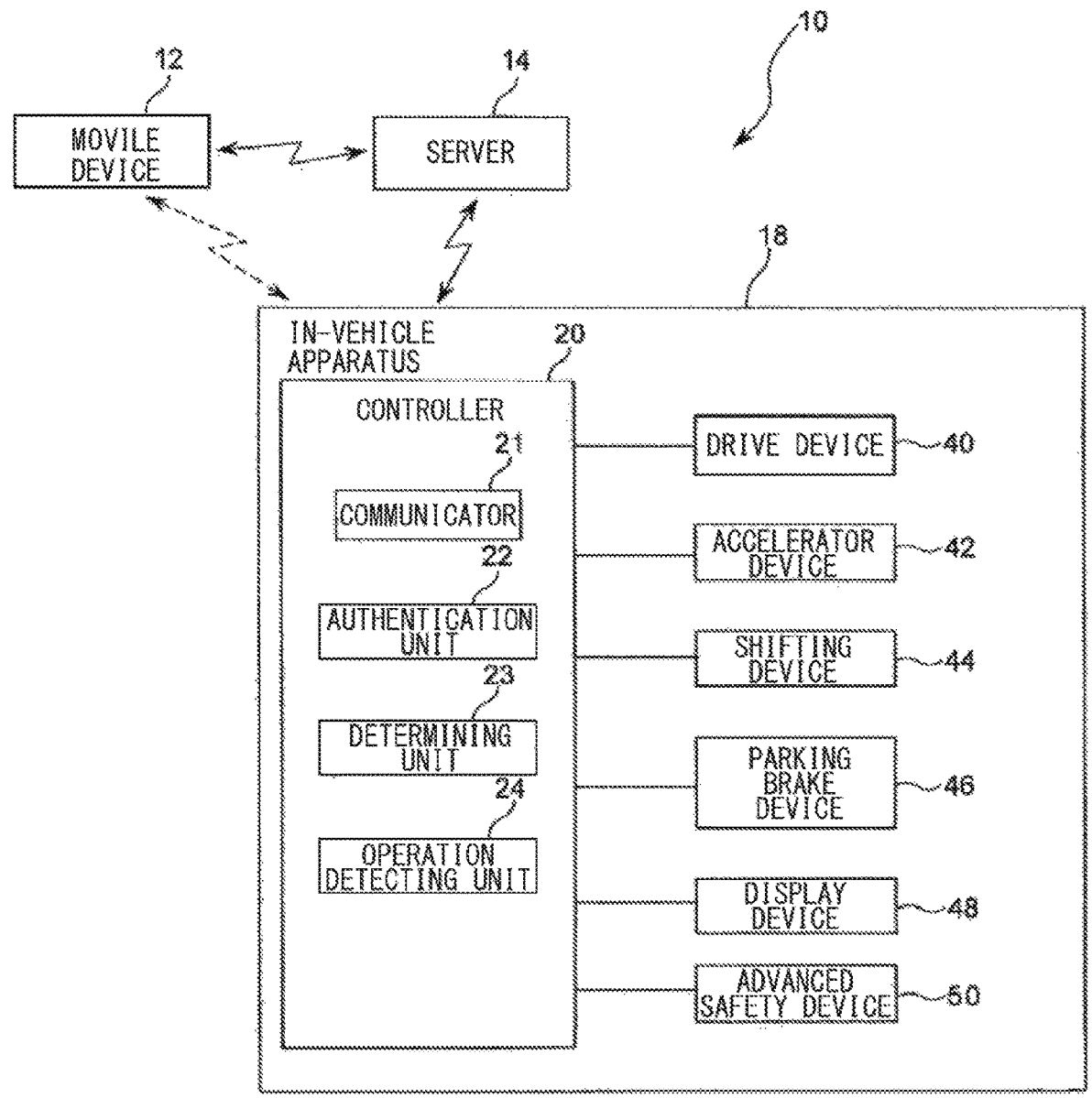
FIG. 2 is a diagram illustrating a system configuration of the vehicle control system illustrated in FIG. 1.

FIG. 1 illustrates an outline of a vehicle control system 10 according to an example embodiment of the technology. FIG. 2 illustrates a system configuration of the vehicle control system 10 illustrated in FIG. 1. Referring to FIG. 1, a driver 60 may sit on a driver's seat 62 provided in a vehicle 16. The vehicle control system 10 includes an in-vehicle apparatus 18. The in-vehicle apparatus 18 is configured to be mounted on the vehicle 16. The vehicle control system 10 may also include a mobile device 12 and a server 14. The in-vehicle apparatus 18 includes a controller 20 and a drive device 40. The in-vehicle apparatus 18 may also include an accelerator device 42, a shifting device 44, a parking brake device 46, a display device 48, and an advanced safety device 50. In one embodiment, the display device 48 may serve as a "warning device". The mobile device 12, the server 14, and the in-vehicle apparatus 18 each may have a communicator, and may communicate with each other via a long-distance telecommunication or a short-distance wireless communication. Non-limiting examples of the long-distance telecommunication may include the Internet and a telephone communication network of a mobile phone.

The mobile device 12 may have a device body that includes, for example, a control circuit, a display, an input operation unit, and the communicator. The control circuit may include a microcomputer. The display may include a touch panel, and may be a liquid crystal panel, for example. The communicator may perform the long-distance telecommunication or the short-distance wireless communication based on Bluetooth (Registered Trademark) or wireless LAN (Local Area Network), for example. Note that the mobile device used in the vehicle control system 10 according to an example embodiment is not limited to the mobile device 12. The mobile device can be any device that includes a touch-operable display and/or an input operation unit and has a communication function, such as a tablet device, a wearable device, or PDA (Personal Digital Assistant).

The mobile device 12 may have typical application software such as voice communication software. The mobile device 12 may also have operation-detecting application software (hereinafter may be referred to as an "operation-detecting application") directed to detection of an operation of the mobile device 12 and downloaded or acquired from the server 14. The operation-detecting application may be executed by the microcomputer included in hardware of the mobile device 12.

The operation-detecting application may determine whether the mobile device 12 is operated by a user. The operation-detecting application may cause an operation detection signal to be transmitted to the in-vehicle apparatus 18 in a case where the operation of the mobile device 12 is detected. The operation detection signal may be transmitted to the in-vehicle apparatus 18 via the server 14, or may be transmitted to the in-vehicle apparatus 18 without any intervention of the server 14. The operation of the mobile device 12 to be detected by the operation-detecting application may include an operation performed by the user on the touch panel serving as an operation screen of the mobile device 12, and/or an operation equivalent to the operation performed on the touch panel. For example, the operation-detecting application may determine that the mobile device 12 is operated in a case where: the user has touched the touch panel of the mobile device 12; the mobile device 12 is operated to unlock the mobile device 12; the display screen of the mobile device 12 is switched from one display screen to another; or the user has operated the mobile device 12 to respond to voice calling or video calling which the mobile device 12 has received.

In this case, the operation-detecting application may cause the operation detection signal to be transmitted to the in-vehicle apparatus 18.

The server 14 may include, for example, an information processor, a storage, and an input/output interface. The information processor may be a processor such as CPU (Central Processing Unit) or ASIC (Application Specific Integrated Circuit). Non-limiting examples of the storage may include RAM (Random Access Memory) and ROM (Read-Only Memory). The server 14 may be provided in an office of a vehicle manufacturer that has manufactured the vehicle 16 or a company or the like commissioned by the vehicle manufacturer (hereinafter referred to as "vehicle manufacturer, etc."), and may be run and managed by the vehicle manufacturer, etc.

The server 14 may wirelessly communicate with the in-vehicle apparatus 18 and the mobile device 12 by the communicator provided in a body of the server 14. The server 14 may acquire data related to the vehicle 16 via an Internet connection. Non-limiting examples of the data related to the vehicle 16 may include: a driving state of the vehicle 16; an authentication ID of the mobile device 12 recorded in the in-vehicle apparatus 18;

and a state of authentication between the in-vehicle apparatus 18 and the mobile device 12. In an example embodiment, the in-vehicle apparatus 18 and the mobile device 12 may communicate with each other through the server 14 as denoted by solid double arrows in FIG. 2. In some embodiments, the in-vehicle apparatus 18 and the mobile device 12 may communicate with each other directly without the intervention of the server 14 as denoted by dashed double arrows in FIG. 2. In the following description on the communication performed between the in-vehicle apparatus 18 and the mobile device 12, the communication performed by the server 14 that relays the communication between the in-vehicle apparatus 18 and the mobile device 12 is not described for easier understanding.

The controller 20 provided in the in-vehicle apparatus 18 may include, for example, an information processor, a storage, and an input/output interface. The information processor may be a processor such as CPU (Central Processing Unit) or ASIC (Application Specific Integrated Circuit). Non-limiting examples of the storage may include RAM (Random Access Memory) and ROM (Read-Only Memory). The controller 20 may be electrically coupled to devices of the vehicle 16 including the drive device 40, the accelerator device 42, the shifting device 44, the parking brake device 46, the display device 48, and the advanced safety device 50, and may control these devices. The controller 20 executes a predetermined safety control in a case where the in-vehicle apparatus 18 satisfies predetermined conditions. In some embodiments, as non-limiting examples of the safety control, the controller 20 may execute an advanced safety function (an advanced safety process) to be performed by the advanced safety device 50, limit an acceleration rate of the vehicle 16, and/or warn the driver 60 by means of the warning device. In some embodiments, the safety control may be continued for a certain time T set in advance to the controller 20. Note that any length of time may be set for the time T. For example, the time T may be 10 seconds without limitation. A description on the safety control is given later in greater detail.

The drive device 40 generates drive force that causes the vehicle 16 to travel. The drive device 40 may have devices including, for example, an engine, a motor, a battery, and a transmission. A factor of the drive device 40, such as output torque of the drive device 40 or a shift stage of an automatic transmission, may be controlled by the controller 20.

The accelerator device 42 may have devices including, for example, an accelerator pedal 43 to be operated by the driver 60 and an accelerator position sensor that detects an amount of pressing of the accelerator pedal 43. In a manual driving mode in which the driver 60 drives the vehicle 16, the controller 20 may accelerate the vehicle 16 in accordance with an amount of pressing of the accelerator pedal 43, on the basis of an input signal received from the accelerator position sensor. The controller 20 may so control the output of the drive device 40 that the acceleration rate increases in a case where the amount of pressing of the accelerator pedal 43 is large, and that the acceleration rate decreases in a case where the amount of pressing of the accelerator pedal 43 is small.

In some embodiments, upon the execution of the safety control, the controller 20 may so control the output of the drive device 40 that a maximum value of the acceleration rate based on the operation of the accelerator pedal 43 of the accelerator device 42 is limited as compared with a maximum value of the acceleration rate in a normal driving control. For example, in a case where the safety control is performed by the controller 20, the in-vehicle apparatus 18 may so control the maximum value of the acceleration rate as to be limited to one-fifth the maximum value of the acceleration rate in the normal driving control or less. Such an example embodiment allows the acceleration rate, which is, e.g., one-fifth the normal acceleration rate or less, to be only obtained during the safety control even when the accelerator pedal 43 is pressed down at a maximum level.

The shifting device 44 may include the shift lever 45 to be operated by the driver 60. A shift range of the automatic transmission of the drive device 40 may be changed in response to a signal indicating a shift position of the shift lever 45 supplied to the controller 20. For example, in a case where the shift position of the shift lever 45 is changed to any of the parking (P) range, the reverse (R) range, the neutral (N) range, and the drive (D) range, the controller 20 may change the shift range of the automatic transmission to any of the parking range, the reverse range, the neutral range, and the drive range in response to the changed shift position of the shift lever 45.

The parking brake device 46 may include a parking brake 47 and a brake mechanism. The parking brake 47 may be provided in the vehicle compartment. The brake mechanism may be switched between a locked state in which braking force is applied to the vehicle 16 and an unlocked state in which the braking force is released. The brake mechanism may be placed into the locked state in which the braking force is applied to wheels of the vehicle 16 to stop the rotation of the wheels in a case where the parking brake 47 is turned on, and may be placed into the unlocked state in which the braking force applied to the wheels is released in a case where the parking brake 47 is turned off. The controller 20 may detect whether the parking brake 47 is turned on or turned off on the basis of a signal supplied from the parking brake 47.

The display device 48 may visually present information to the driver 60. In some embodiments, the display device 48 may serve, in the vehicle control system 10, as the warning device that visually warns the driver 60. In an example embodiment, the display device 48 may be a meter display that displays various pieces of information related to the vehicle 16. In some embodiments, the vehicle control system 10 may generate a warning sound by a speaker 49 mounted on the vehicle 16 to auditorily warn the driver 60 upon the execution of the safety control. The display device 48 and the speaker 49 may be coupled to the controller 20, and each may warn the driver 60 in a case where the safety control is executed by the controller 20.

The advanced safety device 50 may acquire data related to the vehicle 16 and data related to an environment outside the vehicle 16, and transmit the acquired pieces of data to the controller 20, allowing the controller 20 to execute the advanced safety function that assists safety driving of the vehicle 16, on the basis of the acquired pieces of data and a result of the recognition. The advanced safety device 50 may have devices including, for example, a camera that captures an image of the outside of the vehicle 16, various sensors, and any other data recognition device. The advanced safety function may be turned on and off by manually operating a switch 51 provided in the vehicle compartment.

A driving mode switch provided in the vehicle compartment may allow a driving mode to be switched between a manual driving mode and an automatic driving mode in an example embodiment. In the manual driving mode, the driver 60 may manually drive the vehicle 16. In the automatic driving mode, the vehicle 16 may be automatically driven by the controller 20 without requiring an operation of the driver 60. In an example embodiment, the advanced safety function may be turned on in the automatic driving mode. In a case where the advanced safety function is turned on, a control that assists the safety driving of the vehicle 16 may be executed on the basis of the pieces of data acquired by the advanced safety device 50. Non-limiting examples of the control may include: an automatic braking control that recognizes an obstacle present outside of the vehicle 16 and automatically stops the vehicle 16; a cruise control that causes the vehicle 16 to travel at a constant speed; and an adaptive cruise control that has a function of controlling a distance between the vehicle 16 and another vehicle.

A description is now given in detail of the controller 20 of the in-vehicle apparatus 18. The controller 20 includes an authentication unit 22, a determining unit 23, and an operation detecting unit 24. The controller 20 may also include the communicator 21.

The communicator 21 may perform data communication between the mobile device 12 and the server 14, configuring a telematics system.

The authentication unit 22 performs authentication of the mobile device 12. The authentication unit 22 may perform the authentication of the mobile device 12 on the basis of the authentication ID transmitted from the mobile device 12 through the communicator 21. For example, the authentication may involve transmitting the authentication ID to the controller 20 of the in-vehicle apparatus 18 from the mobile device 12 via the short-distance wireless communication, and determining whether the authentication ID received by the authentication unit 22 corresponds to the authentication ID recorded in advance in the controller 20. The authentication unit 22 may determine that the authentication is successful in a case where the authentication ID received by the authentication unit 22 corresponds to the authentication ID recorded in the controller 20. The authentication unit 22 may determine that the authentication is failed in a case where the authentication ID received by the authentication unit 22 does not correspond to the authentication ID recorded in the controller 20. A result of the authentication, i.e., the success or the failure of the authentication, may be transmitted to the mobile device 12 via the communicator 21. The mobile device 12 may cause a display of the mobile device 12 to display a result of the authentication received from the communicator 21.

The authentication unit 22 may unlock the drive device 40 of the vehicle 16 in a case where the authentication between the controller 20 and the mobile device 12 is successful. In an example embodiment, the drive device 40 may be started in a case where an ignition switch is turned on, on a condition that the authentication is successful and the drive device 40 is unlocked accordingly.

In some embodiments, the vehicle control system 10 may allow the drive device 40 of the vehicle 16 to be started by the authentication based on an electronic key carried by the user of the vehicle 16, instead of the authentication based on the mobile device 12. The starting of the drive device 40 based on the electronic key may first involve a wireless communication performed between the electronic key and the in-vehicle apparatus 18. The controller 20 may unlock the drive device 40 in a case where an ID code of the electronic key and an ID code recorded in advance in the controller 20 of the in-vehicle apparatus 18 correspond to each other. In a case where the drive device 40 is unlocked, the drive device 40 may be started by turning on the ignition switch. The vehicle control system 10 according to any embodiment of the technology may use either one of the mobile device 12 and the electronic key to allow the drive device 40 to be started and to allow the vehicle 16 to travel.

The determining unit 23 determines whether the vehicle 16 is in a predetermined driving state. The determining unit 23 may determine whether the vehicle 16 is in the predetermined driving state on the basis of the position of the shift lever 45 of the shifting device 44 and turning on or off of the parking brake 47 of the parking brake device 46. For example, the determining unit 23 may determine that the vehicle 16 is not in the predetermined driving state in a case where the shift lever 45 is detected as being in the parking range, the parking brake 47 is detected as being turned on, or both of them are detected, on the basis of input signals supplied from the shifting device 44 and the parking brake device 46. In this case, the determining unit 23 may determine that the vehicle 16 is stopped and not in a state of driving. The determining unit 23 may determine that the vehicle 16 is in the predetermined driving state on a condition that: the shift lever 45 is at any position other than the parking range; and the parking brake 47 is turned off. In this case, the determining unit 23 may determine that the vehicle 16 is in the state of driving.

The operation detecting unit 24 detects the presence of the operation of the mobile device 12 by receiving the operation detection signal transmitted from the mobile device 12. In an example embodiment, the operation detecting unit 24 may enter an operation detecting mode on a condition that: the authentication of the mobile device 12 by the authentication unit 22 is successful; the drive device 40 is unlocked as a result of the success in the authentication; and the vehicle 16 is determined by the determining unit 23 as being in the state of driving. In a case where the operation detecting mode is established, the operation detecting unit 24 may enter a state in which the operation detection signal to be transmitted from the mobile device 12 is receivable. The operation detecting unit 24 may determine that the mobile device 12 is operated in a case where the operation detecting unit 24 receives the operation detection signal transmitted from the mobile device 12. The operation detecting unit 24 may determine that no operation of the mobile device 12 is present in a case where the operation detecting unit 24 does not receive any operation detection signal.

Figure 3A:
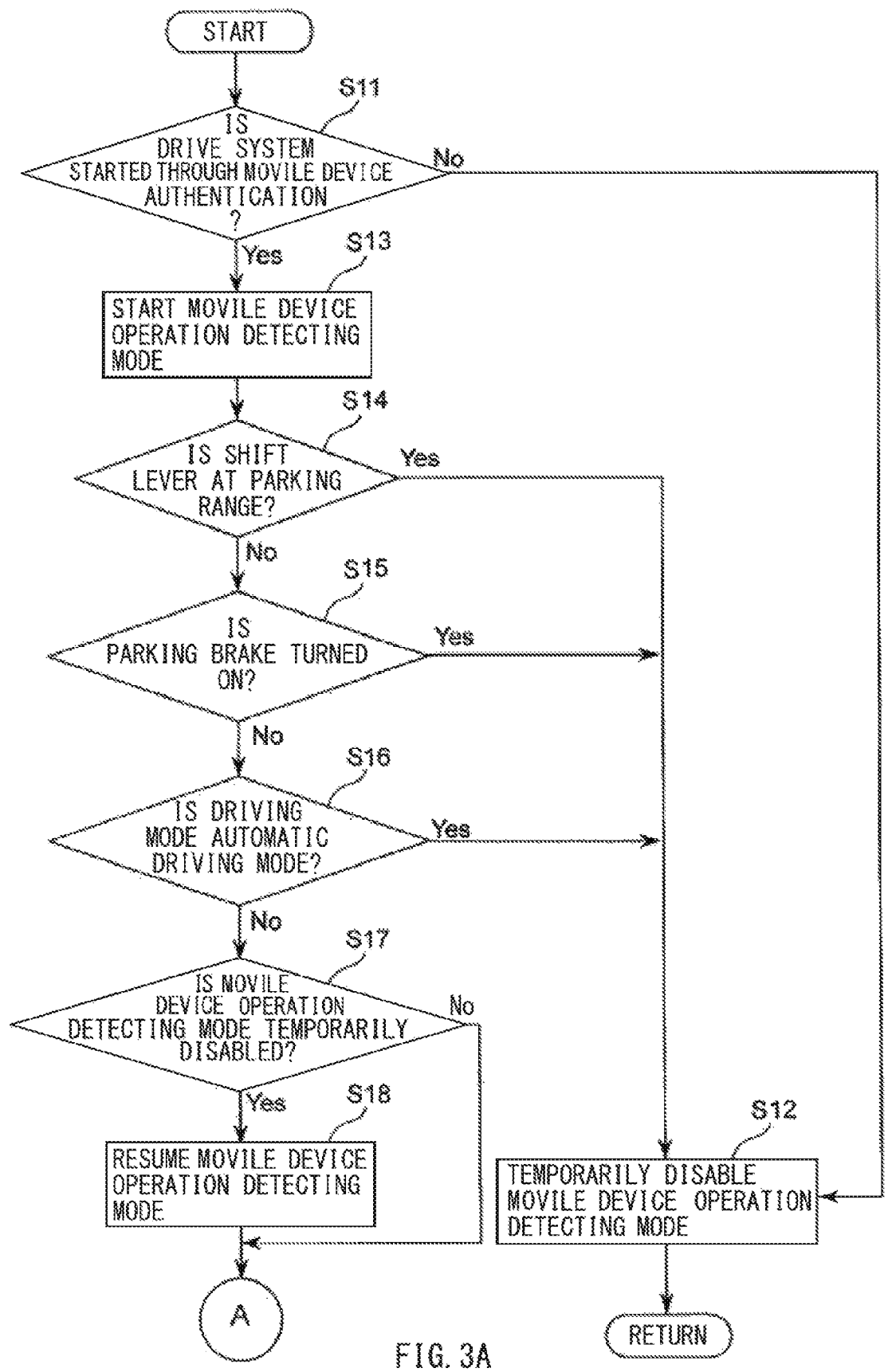
FIG. 3A is a flowchart illustrating an example of an operation process to be performed by a controller of an in-vehicle apparatus illustrated in FIG. 2.
Figure 3B:
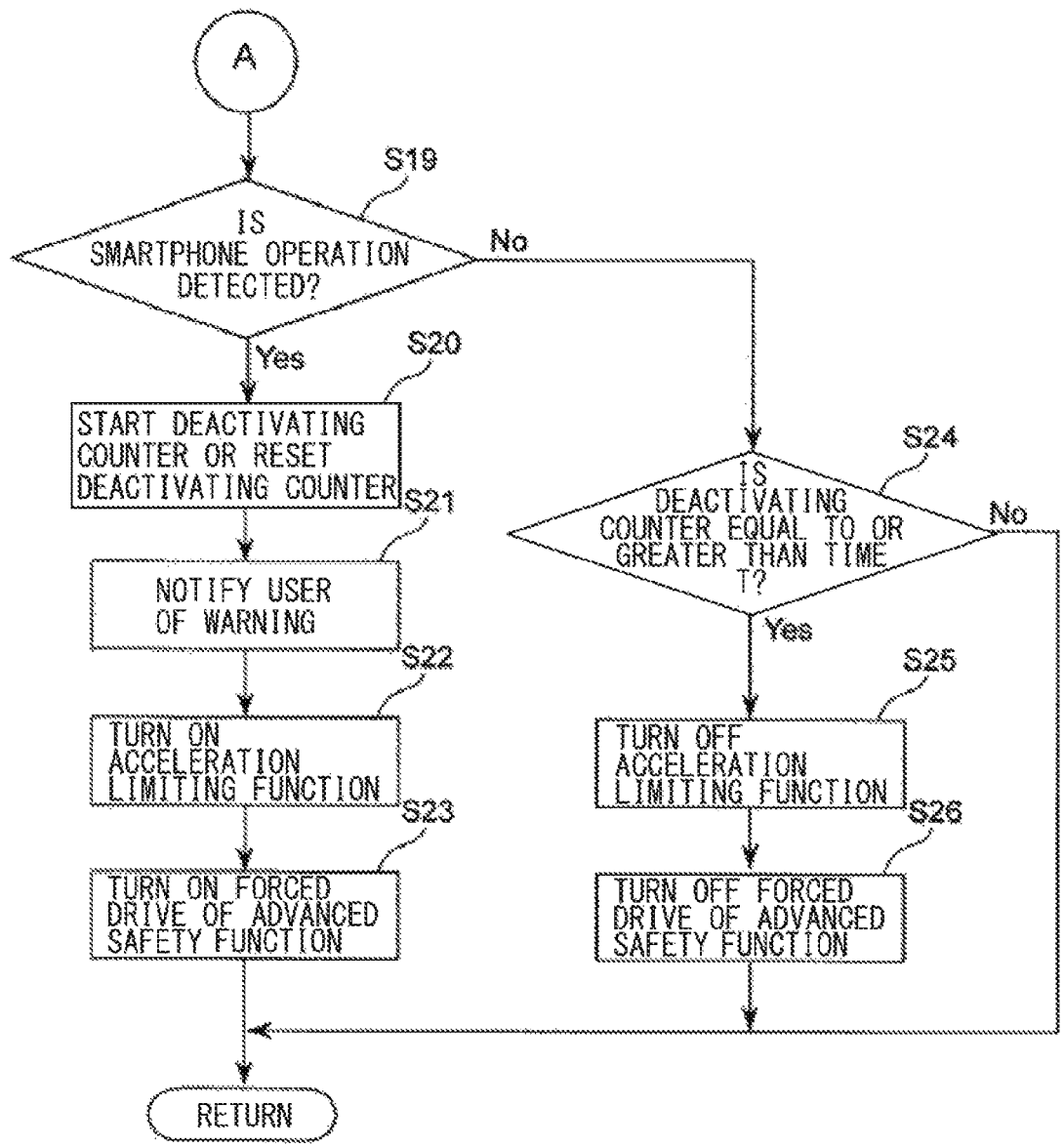
FIG. 3B is a flowchart illustrating an example of an operation process to be performed by the controller of the in-vehicle apparatus illustrated in FIG. 2.

A description is given next, with reference to flowcharts illustrated in FIGS. 3A and 3B, of an operation process to be performed by the controller 20 of the vehicle control system 10.

The controller 20 may first determine whether the drive device 40 is started as a result of: the success in the authentication of the mobile device 12 performed by the authentication unit 22, the unlocking of the drive device 40 following the success in the authentication; and the turning on of the ignition switch (step S11). If the authentication of the mobile device 12 is not performed and the drive device 40 is started by the authentication based on the electronic key (step S11: No), the controller 20 may disable the operation detecting mode of the operation detecting unit 24, i.e., may cause the operation detecting unit 24 not to receive the operation detection signal (step S12). Thereafter, the controller 20 may return the process.

If the drive device 40 is determined in step S11 as being started as a result of the unlocking of the drive device 40 following the success in the authentication of the mobile device 12 and the turning on of the ignition switch (step S11: Yes), the controller 20 may set the operation detecting unit 24 to the operation detecting mode, and may start detecting the presence of the operation of the mobile device 12 (step S13). Thereafter, the controller 20 may determine whether the position of the shift lever 45 is in the parking range, on the basis of the input signal received from the shifting device 44 (step S14).

If the shift lever 45 is determined in step S14 as being in the parking range (step S14: Yes), the controller 20 may deactivate the operation detecting mode of the operation detecting unit 24 (step S12). Thereafter, the controller 20 may return the process. If the shift lever 45 is determined in step S14 as being at any position other than the parking range (step S14: No), the controller 20 may determine whether the parking brake 47 is turned on, on the basis of the input signal received from the parking brake device 46 (step S15).

If the parking brake 47 is determined in step S15 as being turned on (step S15: Yes), the controller 20 may deactivate the operation detecting mode of the operation detecting unit 24 (step S12). Thereafter, the controller 20 may return the process. If the parking brake 47 is determined in step S15 as being turned off (step S15: No), the controller 20 may determine whether the driving mode of the vehicle 16 is the automatic driving mode (step S16).

If the driving mode is determined in step S16 as being the automatic driving mode (step S16: Yes), the controller 20 may deactivate the operation detecting mode of the operation detecting unit 24 (step S12). Thereafter, the controller 20 may return the process. If the driving mode is determined in step S16 as not being the automatic driving mode, i.e., determined as being the manual driving mode (step S16: No), the controller 20 may determine whether the operation detecting unit 24 is in the operation detecting mode or the operation detecting mode is deactivated (step S17). If the controller 20 determines that the operation detecting mode is deactivated (step S17: Yes), the controller 20 may set the operation detecting unit 24 to the operation detecting mode (step S18). Thereafter, the controller 20 may advance the process to step S19. If the controller 20 determines that the operation detecting unit 24 is in the operation detecting mode (step S17: No), the controller 20 may directly advance the process to step S19.

In step S19, the controller 20 may determine whether the operation detecting unit 24 has received the operation detection signal transmitted from the mobile device (step S19). If the controller 20 determines that the operation detecting unit 24 has received the operation detection signal, the controller 20 may determine that the mobile device 12 is operated (step S19: Yes). Thereafter, the controller 20 may start counting the time T during which the safety control is continued (step S20), and execute the safety control. For example, in some embodiments, the controller 20 may activate the display device 48 and the speaker 49 each serving as the warning device to warn the driver 60 (step S21). In some embodiments, the controller 20 may turn on the function of limiting the acceleration rate of the accelerator device 42 to limit the maximum value of the acceleration rate (step S22). In some embodiments, the controller 20 may activate the advanced safety device 50 of the in-vehicle apparatus 18 to turn on the advanced safety function of the vehicle 16 (step S23). Thereafter, the controller 20 may return the process.

If the operation of the mobile device 12 is detected again during the execution of the safety control following the starting of the safety control and the returning of the process (step S19: Yes), the controller 20 may reset its counter (step S20). In this case, the safety control may be continued for the time T from the timing at which the operation of the mobile device 12 is newly detected.

Meanwhile, if the controller 20 determines in step S19 that the operation detecting unit 24 has not received the operation detection signal from the mobile device 12 (step S19: No), the controller 20 may determine whether a time counted by the counter is equal to or greater than the time T (step S24). If the time counted by the counter is determined as not being equal to or greater than the time T (step S24: No), the controller 20 may return the process. If the time counted by the counter is determined as being equal to or greater than the time T (step S24: Yes), the controller 20 may turn off the function of limiting the acceleration rate of the accelerator device 42 to turn the control back to a normal control that does not limit the maximum value of the acceleration rate (step S25). The controller 20 may also turn off the advanced safety function performed by the advanced safety device 50 (step S26) and set the driving mode to the manual driving mode. Thereafter, the controller 20 may return the process.

The vehicle control system 10 according to an example embodiment as described above causes the in-vehicle apparatus 18 and the mobile device 12 to communicate with each other, and causes the in-vehicle apparatus 18 to perform the authentication of the mobile device 12 to unlock the drive device 40 and thereby to start the drive device 40. Thus, the vehicle control system 10 allows for the recognition, by the in-vehicle apparatus 18, of the mobile device 12 belonging to the driver 60 upon driving the vehicle 16. The in-vehicle apparatus 18 sets the operation detecting unit 24 to the operation detecting mode to receive the operation detection signal to be transmitted from the mobile device 12, in a case where the vehicle 16 is in the predetermined driving state after the success in the authentication of the mobile device 12. For example, the in-vehicle apparatus 18 may set the operation detecting unit 24 to the operation detecting mode after the success in the authentication of the mobile device 12 in a case where the vehicle 16 is determined as being in the state of driving, on a condition that: the shift lever 45 of the shifting device 44 of the vehicle 16 is at any position other than the parking range; and the parking brake 47 is turned off. By receiving the operation detection signal to be transmitted from the mobile device 12 in a case where the vehicle 16 is in the predetermined driving state, it is possible to directly detect the presence of the operation of the mobile device 12 and thereby to detect the operation of the mobile device 12 performed during the driving.

The in-vehicle apparatus 18 also executes the safety control in a case where the mobile device 12 is determined as being operated during the driving. Thus, it is possible to ensure safety of the vehicle 16. In some embodiments, the advanced safety device 50 may be forcibly activated to turn on the advanced safety function upon the execution of the safety control, making it possible to assist the safety driving of the vehicle 16 by, for example, the automatic braking control or the adaptive cruise control. In some embodiments, the warning may be performed on the driver 60 by the display device 48 and the speaker 49 upon the execution of the safety control, making it possible to restrain or prohibit the driver 60 from operating the mobile device 12 and thereby to ensure safety of the vehicle 16. In some embodiments, the warning may be performed by either one of the display device 48 and the speaker 49.

In some embodiments, the function of limiting the acceleration rate may be turned on upon the execution of the safety control, making it possible to prevent sudden acceleration of the vehicle 16 due to erroneous operation of the accelerator pedal 43 during the driving. Hence, it is possible to reduce an occurrence of an accident and thereby to ensure safety of the vehicle 16. In an alternative embodiment, the acceleration of the vehicle 16 may be disabled in a case where the function of limiting the acceleration rate is turned on. In some embodiments, however, the maximum value of the acceleration rate in a case where the function of limiting the acceleration rate is turned on may be set to be greater than zero to accept moderate acceleration of the vehicle 16 while preventing the sudden acceleration if the driver 60 wishes to accelerate the vehicle 16 during the execution of the safety control.

In some embodiments, the vehicle control system 10 may automatically deactivate the safety control after the elapse of the predetermined time T from the execution of the safety control. Hence, it is possible to prevent a decrease in operability of the driving to be performed by the driver 60 due to the continuation of the safety control for a long period of time.

In some embodiments, a switch that deactivates the safety control may be provided in the vehicle compartment to manually deactivate the safety control, instead of automatically deactivating the safety control resulting from the elapse of the time T. In such embodiments, the driver 60 may operate the switch to deactivate the safety control. In some embodiments, the automatic deactivation and the manual deactivation of the safety control may be combined to deactivate the safety control. In such embodiments, in a case where the switch is operated, it is possible to deactivate the safety control even when the time T has not been elapsed.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the controller 20 according to an example embodiment described above may execute, as the safety control, three controls including activating the advanced safety function, limiting the acceleration rate, and issuing the warning by means of the warning device. In some embodiments, the controller 20 may execute at least one of the three controls.

The warning device is not limited to the display device 48 or the speaker 49. In some embodiments, the warning device may perform haptic warning. For example, the warning device may vibrate the driver's seat 62 or a steering wheel 64 in the vehicle 16 to raise a driver's attention.

According to at least one embodiment of the technology, the vehicle control system causes the in-vehicle apparatus to perform the authentication of the mobile device to unlock the drive device. Hence, it is possible to allow the in-vehicle apparatus to recognize the mobile device belonging to the driver upon driving the vehicle. Further, the in-vehicle apparatus receives the signal to be transmitted from the mobile device in a case where the vehicle is determined as being in the predetermined driving state, i.e., determined as being in the state of driving. Hence, it is possible to directly detect that the mobile device is operated and thereby to detect the operation of the mobile device performed during the driving. Further, the in-vehicle apparatus also executes the predetermined safety control in a case where the mobile device is determined as being operated during the driving. Hence, it is possible to ensure safety of the vehicle.

In some embodiments, the advanced safety device of the vehicle may be activated to execute the advanced safety function in a case where the mobile device is determined as being operated by the driver during the driving. Thus, it is possible to ensure safety of the vehicle.

In some embodiments, it possible to prevent the sudden acceleration of the vehicle due to the erroneous operation of the accelerator pedal of the vehicle performed by the driver while operating the mobile device during the driving. Hence, it is possible to reduce an occurrence of an accident and thereby to ensure safety of the vehicle.

In some embodiments, the warning device may warn the driver in a case where the mobile device is determined as being operated by the driver during the driving. Hence, it is possible to restrain or prohibit the driver from operating the mobile device and thereby to ensure safety of the vehicle.

In some embodiments, it is possible to prevent a decrease in driving operability due to the continuation of the execution of the safety control for a long period of time.

According to at least one embodiment of the technology, it is possible to provide a vehicle control system that is able to detect an operation of a mobile device during driving of a vehicle and to ensure safety of the vehicle in a case where the mobile device is operated.

The controller 20 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 20 illustrated in FIG. 2.

The invention claimed is:

1. A vehicle control system comprising:
an in-vehicle apparatus to be mounted on a vehicle and configured to perform a wireless communication with a mobile device of a driver of the vehicle, the in-vehicle apparatus including:
  a drive device configured to generate drive force that causes the vehicle to travel;
  an authentication unit configured to perform authentication of the mobile device on a basis of the wireless communication with the mobile device for unlocking the drive device;
  a determining unit configured to determine whether the vehicle is in a driving state where the vehicle is in drivable or in motion in a manual driving mode, wherein the determining unit is configured to determine that the vehicle is in the driving state based on determining that a shift lever of the vehicle at a position other than a parking range and determining that a parking brake of the vehicle is turned off; and
  an operation detecting unit configured to have an operation detecting mode to determine that the driver uses the mobile device based on receiving an operation detecting signal which is transmitted from the mobile device in response to the driver operating the mobile device,
wherein, in response to (1) unlocking the drive device as a result of success in the authentication and (2) determining that the vehicle is in the driving state where the vehicle is in drivable or in motion in the manual driving mode, the in-vehicle apparatus is further configured to enable the operation detecting mode of the operation detecting unit,
wherein, in response to the operation detecting unit in the operation detecting mode determining that the driver uses the mobile device, the in-vehicle apparatus is further configured to execute a predetermined safety control that promotes safety of the vehicle.

2. The vehicle control system according to claim 1, wherein
the in-vehicle apparatus further includes an advanced safety device configured to assist safety driving of the vehicle, and
the in-vehicle apparatus is configured to cause the advanced safety device to perform an advanced safety process upon the execution of the safety control.

3. The vehicle control system according to claim 1, wherein the in-vehicle apparatus is configured to limit a maximum value of an acceleration rate of the vehicle upon the execution of the safety control.

4. The vehicle control system according to claim 2, wherein the in-vehicle apparatus is configured to limit a maximum value of an acceleration rate of the vehicle upon the execution of the safety control.

5. The vehicle control system according to claim 1, wherein
the in-vehicle apparatus further includes a warning device configured to give, to the driver of the vehicle, at least one of a visual warning, an auditory warning, or a haptic warning, and
the in-vehicle apparatus is configured to activate the warning device to warn the driver upon the execution of the safety control.

6. The vehicle control system according to claim 2, wherein
the in-vehicle apparatus further includes a warning device configured to give, to the driver of the vehicle, at least one of a visual warning, an auditory warning, or a haptic warning, and
the in-vehicle apparatus is configured to activate the warning device to warn the driver upon the execution of the safety control.

7. The vehicle control system according to claim 3, wherein
the in-vehicle apparatus further includes a warning device configured to give, to the driver of the vehicle, at least one of a visual warning, an auditory warning, or a haptic warning, and
the in-vehicle apparatus is configured to activate the warning device to warn the driver upon the execution of the safety control.

8. The vehicle control system according to claim 4, wherein
the in-vehicle apparatus further includes a warning device configured to give, to the driver of the vehicle, at least one of a visual warning, an auditory warning, or a haptic warning, and
the in-vehicle apparatus is configured to activate the warning device to warn the driver upon the execution of the safety control.

9. The vehicle control system according to claim 1, wherein the in-vehicle apparatus is configured to deactivate the safety control after an elapse of a predetermined time from the execution of the safety control.

10. The vehicle control system according to claim 2, wherein the in-vehicle apparatus is configured to deactivate the safety control after an elapse of a predetermined time from the execution of the safety control.

11. The vehicle control system according to claim 3, wherein the in-vehicle apparatus is configured to deactivate the safety control after an elapse of a predetermined time from the execution of the safety control.

12. The vehicle control system according to claim 4, wherein the in-vehicle apparatus is configured to deactivate the safety control after an elapse of a predetermined time from the execution of the safety control.

13. The vehicle control system according to claim 5, wherein the in-vehicle apparatus is configured to deactivate the safety control after an elapse of a predetermined time from the execution of the safety control.

14. The vehicle control system according to claim 6, wherein the in-vehicle apparatus is configured to deactivate the safety control after an elapse of a predetermined time from the execution of the safety control.

15. The vehicle control system according to claim 7, wherein the in-vehicle apparatus is configured to deactivate the safety control after an elapse of a predetermined time from the execution of the safety control.

16. The vehicle control system according to claim 8, wherein the in-vehicle apparatus is configured to deactivate the safety control after an elapse of a predetermined time from the execution of the safety control.

17. A vehicle control system comprising
an in-vehicle apparatus to be mounted on a vehicle and configured to perform a wireless communication with a mobile device of a driver of the vehicle, the in-vehicle apparatus including:
a drive device including one of an engine, a motor, a battery, and a transmission, and configured to generate drive force that causes the vehicle to travel; and
a controller electrically coupled to the drive device, and configured to:
perform authentication of the mobile device on a basis of the wireless communication with the mobile device, and in response to success in the authentication, unlock the drive device;
determine whether the vehicle is in a driving state where the vehicle is the driving state where the vehicle is in drivable or in motion in a manual driving mode wherein the controller is configured to determine that the vehicle is in the driving state based on determining that a shift lever of the vehicle at a position other than a parking range and determining that a parking brake of the vehicle is turned off;
in response to (1) unlocking the drive device as a result of success in the authentication and (2) determining that the vehicle is in the driving state where the vehicle is in drivable or in motion in the manual driving mode, enable an operation detecting mode to determine that the driver uses the mobile device based on receiving an operation detecting signal which is transmitted from the mobile device in response to the driver operating the mobile device;
in response to receiving the operation detecting signal from the mobile device in the operation detecting mode, detect that the driver uses the mobile device; and
in response to determining that the driver uses the mobile device, execute a predetermined safety control that promotes safety of the vehicle.

18. The vehicle control system according to claim 1, wherein the in-vehicle apparatus is configured to start the drive device by turning on an ignition switch of the vehicle after the drive device is unlocked.

19. The vehicle control system according to claim 1, wherein the mobile device is configured to transmit to the in-vehicle apparatus the operation detecting signal in a case where: the driver touches an touch panel of the mobile device; the mobile device is unlocked; a display screen of the mobile device is switched from one display screen to another; and the driver operates the mobile device to answer to a call which the mobile device receives.

* * * * *